(12) United States Patent
Van Der Meulen

(10) Patent No.: US 6,563,769 B1
(45) Date of Patent: May 13, 2003

(54) VIRTUAL JUKEBOX

(75) Inventor: Pieter Van Der Meulen, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/326,506

(22) Filed: Jun. 4, 1999

Related U.S. Application Data

(60) Provisional application No. 60/088,912, filed on Jun. 11, 1998, and provisional application No. 60/093,656, filed on Jul. 22, 1998.

(51) Int. Cl.[7] .............................................. G11B 17/22
(52) U.S. Cl. ................... 369/30.06; 707/104.1
(58) Field of Search ........................ 369/30.06, 30.28, 369/34.01, 30.2, 30.29, 30.3, 30.23, 30.09, 30.08, 30.26, 30.64; 700/234; 707/104.1; 710/17, 39; 709/217

(56) References Cited

U.S. PATENT DOCUMENTS

| | | | |
|---|---|---|---|
| 5,530,899 A | | 6/1996 | MacDonald ................ 395/837 |
| 5,616,876 A | | 4/1997 | Cluts ............................ 84/609 |
| 5,924,275 A | * | 7/1999 | Cohen et al. |
| 5,930,768 A | * | 7/1999 | Hooban |
| 6,011,758 A | * | 1/2000 | Dockes et al. |
| 6,128,625 A | * | 10/2000 | Yankowski |
| 6,175,537 B1 | * | 1/2001 | Fleming, III |
| 6,226,235 B1 | * | 5/2001 | Wehmeyer |
| 6,243,328 B1 | * | 6/2001 | Fenner et al. |
| 6,421,305 B1 | * | 7/2002 | Gioscia et al. |
| 6,430,117 B2 | * | 8/2002 | Zimmer |

* cited by examiner

Primary Examiner—Ali Neyzari
(74) Attorney, Agent, or Firm—Jeroen Heuvelman

(57) ABSTRACT

A collection management system, or virtual jukebox, is provided for a collection of recordings that is independent of the physical media upon which the material is recorded. The system forms a part of a network that includes storage media and playback devices, and provides an easy to use system for collection cataloging, archiving, and retrieval. In a preferred embodiment, a collection management system resides on a consumer electronic (CE) device, or a personal or home computer (PC), and the collection includes recordings that are stored on one or more hard drives associated with the CE device or the PC. The collection management system includes a user interface that facilitates the retrieval of recordings for playback from one or more storage devices, based on an individual selection of genre, author, and so on. By storing the recordings on a hard disc drive or other mass storage device with an associated disk operating system, immediate access is available to each recording on the drive, and additional drives can be added to the system as new material is added to the collection.

11 Claims, 5 Drawing Sheets

VIRTUAL JUKEBOX

This application claims the benefit of U.S. Provisional Application No. 60/088,012, filed Jun. 11, 1998, and U.S. Provisional Application No. 60/093,656, filed Jul. 22, 1998.

BACKGROUND OF THE INVENTION

1. Field of the Invention

This invention relates to the field of consumer electronics, and in particular to recording and playback systems.

2. Description of Related Art

Most consumers have collections of recordings in one form or another. Records, tapes, CDs, DVDs, and the like are the conventional media for these recordings, each having a corresponding means for playing back the recorded information on demand. Conventionally, racks and similar devices are used to contain these recordings. Various methods are used by consumers to order the arrangement of the recordings within their storage racks: alphabetic by author, alphabetic by title, grouped by genre, color-coded tagging, and so on. A selection of a particular recording requires locating the appropriate disk or tape on the rack and placing it in the playback device. After playback, the recording is placed back on the rack, in it's appropriate order. The physical handling and ordering task can be particularly problematic in a multi-user environment, such as a home.

With advancing technology, some playback devices are configured to allow for the storage of hundreds of disks, akin to a prior-art "jukebox" that allows for the selection of individual songs without physically handling the recorded media. These devices often include automated playback selection by genre or other categorization, random playback, and so on. Although these devices ease the media handling task, and facilitate an improved method of categorization and organization, they have a fixed physical limit. When a user's collection exceeds the capacity of the storage-playback device, the user must either replace the existing device with a larger capacity device, if available, or select a portion of the collection for storage and organization in the storage-playback device. Purchasing a second, or third storage-playback device is not a currently practical option, because the organization and playback control capabilities of current devices are isolated from each other.

Many consumers have more than one playback device for a given medium. In a multi-playback environment, a user must typically physically divide the collection, allocating select recordings to each playback locale. For example, a user may have a few CDs in an automobile, a few CDs in an office, and the remainder of the collection in a family room. Alternatively; copies of the recordings are made, and distributed to each locale, but the recording task is typically somewhat cumbersome, requiring the finding and loading of a blank medium, creation of a label, and so on.

BRIEF SUMMARY OF THE INVENTION

It is an object of this invention to provide a device and method for creating a collection of recordings that can be readily accessed. It is another object of this invention to provide a device and method for creating a collection of recordings that is easy to create and categorize. It is another object of this invention to provide a device and method for creating a collection of recordings that is easy to expand and modify. It is another object of this invention to reduce the storage requirements for a collection of recordings. It is a further object of this invention to provide a device and method for accessing databases of information relating to items contained in a collection of recordings. It is a further object of this invention to provide a means of protecting a collection of recordings from loss. It is a further object of this invention to provide a visual interface to access a collection of recordings. It is a further object of this invention to provide a hierarchical visual interface to access a collection of recordings.

These objects and others are achieved by providing a collection management system, or virtual jukebox, for a collection of recordings that is independent of the physical media upon which the material is recorded. The system forms a part of a network that includes storage media and playback devices, and provides an easy to use system for collection cataloging, archiving, and retrieval. In a preferred embodiment, a collection management system resides on a consumer electronic (CE) device, or a personal or home computer (PC), and the collection includes recordings that are stored on one or more hard drives associated with the CE device or the PC.

The collection management system includes a user interface that facilitates the retrieval of recordings for playback from one or more storage devices, based on an individual selection of genre, author, and so on. By storing the recordings on a hard disc drive or other mass storage device with an associated disk operating system, immediate access is available to each recording on the drive, and additional drives can.be added to the system as new material is added to the collection.

BRIEF DESCRIPTION OF THE DRAWINGS

The invention is explained in further detail, and by way of example, with reference to the accompanying drawings wherein.

Throughout the drawings, same reference numerals indicate similar or corresponding features or functions.

DETAILED DESCRIPTION OF THE INVENTION

Figure 1:
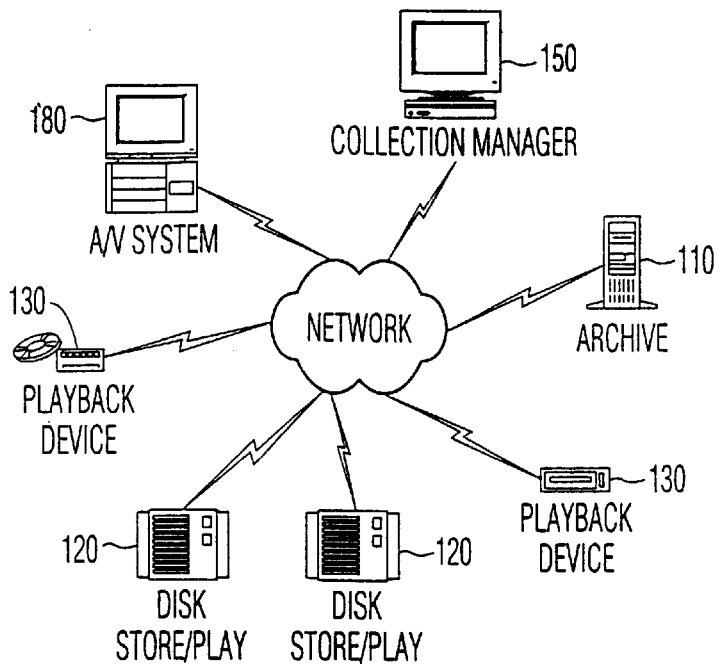
FIG. 1 illustrates an example block diagram of a network comprising a collection management system in accordance with this invention.

FIG. 1 illustrates an example block diagram of a network 100 comprising a collection management system in accordance with this invention. The collection resides on one or more storage devices that contain recordings of material, such as music or video recordings. The storage devices may include an archive set of files on one or more hard disk drives 110, one or more combination storage and playback devices 120, or some other storage devices (not shown) that are connected to the network 100, such as to provide access to files on a server, an Internet site, and so on. Note that in a networked environment, the collection may comprise content material that the user merely has access to, such as recordings or performances provided by a service provider based on a license or purchase agreement with the user. Note also that the term "playback" is used herein in the general sense of providing an output signal corresponding to a recorded content, a transmitted content, or an other source of content material.

The collection management system comprises the collection manager 150 that contains a user interface that provides a controlled access to the one or more storage devices 110, 120. That is, the collection management system forms a "virtual jukebox" that allows for a selection from among a plurality of recordings in the collection contained within the associated storage devices 110, 120. Also illustrated on the network are playback devices 130, such as a CD or DVD player, a tape player, a record player, and the like, and an audio/video system 180 that allows for the presentation of the material that is played from the storage and playback devices 110, 120, 130.

Figure 2A:
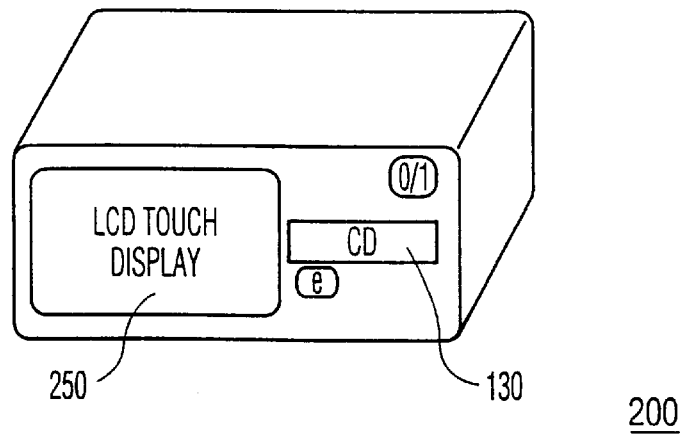
FIG. 2 illustrates an example embodiment of a collection management system in accordance with this invention.
Figure 2B:
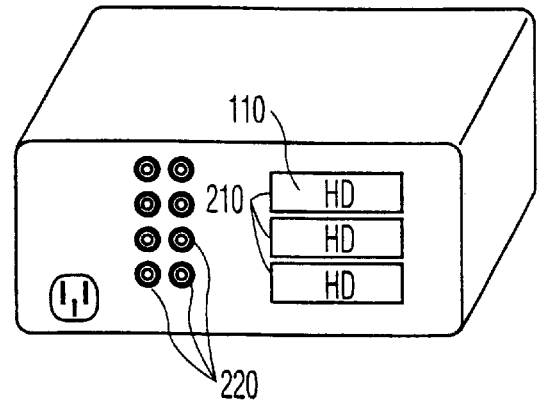

In a preferred embodiment, a combination of components 110, 120, 130, 150, 180 is embodied as an integrated system, thereby allowing for use in a dedicated system, a distributed system, or a combination of both. FIG. 2 illustrates an example embodiment of an integrated system 200 that includes both storage and playback capabilities. As is discussed further herein, the collection management system includes facilities to automate the playback of selected recordings, for example, via a random play of selections of the same selected genre. To facilitate a playback of a selection without the typical delays associated with the selection of a recording via mechanical means, a preferred embodiment includes an archiving of recordings onto a medium having a relatively fast selection and access time, such as a "hard drive" disk memory device with an addressable file access means. Alternative random access file devices, such as recordable DVDs and mass storage semiconductor memory, may also be used. Existing technology, such as MPEG or Philips' DCC audio compression, can be applied to compress each recording for efficient archiving. For example, using Philips' DCC audio compression, a conventional 40 minute/350 MB audio CD can be compressed into about 33 MB of data. Therefore, a conventional 10 GB hard disk drive could contain approximately 300 audio CDs, or more than 3000 songs. Although the size of video data files, such as an MPEG encoding of a full length movie, does not currently allow for an economically viable mass storage on a hard drive disk memory, this aspect of the invention can be applied to video data: files as larger capacity disk drives become available.

A preferred embodiment of the integrated system 200 includes at least one playback device 130, at least one hard disc drive 110, and interconnection means 220 for accessing other items, or appliances, on a network. See, for example, the HAVi architecture and the Home API initiative, for home-networks, both involving substantial contributions from Philips Electronics, the Jini technology of Sun Microsystems, Inc., etc. In a simple embodiment, the interconnection means 220 may merely connect to an amplifier, a television, a set of speakers, and so on, for rendering the recorded information. For use as a stand-alone system, the integrated system 200 may optionally include an integral amplifier and speaker system (not shown).

The integrated system 200 also includes an LCD touch display device 250 for interacting with the collection manager 150 (not shown) within the system 200. The display device 250 may also be used as an auxiliary rendering device, or A/V system 180, for viewing video recordings in the collection. For ease of reference, the integrated system 200 is used hereinafter as the paradigm for a collection management system in accordance with this invention, although as previously noted, the components of the system 200 could be distributed throughout a network, located in a computing device, and so on.

Of note are the multiple bays 210 of FIG. 2. Using conventional disk operating system techniques, the collection manager 150 stores recordings at directly addressable storage locations on a hard disk drive 110. In a preferred embodiment, the system 200 is provided with one hard drive 110, the remaining bays 210 being empty. As discussed above, a conventional 10 GB hard disk has the capacity to hold more than 300 audio CDs, or well over 3000 songs. If the collection becomes larger than 300 CDs, additional hard drives can be added at each bay location 201. Thus, by using a conventional disc operating system, the collection system of this invention is limited only by the number of files that can be indexed by the collection system. By using conventional dynamic tables, linked lists, and the like for such indexing, it would be apparent to one of ordinary skill in the art that the maximum size of the collection is virtually unlimited.

Figure 3:
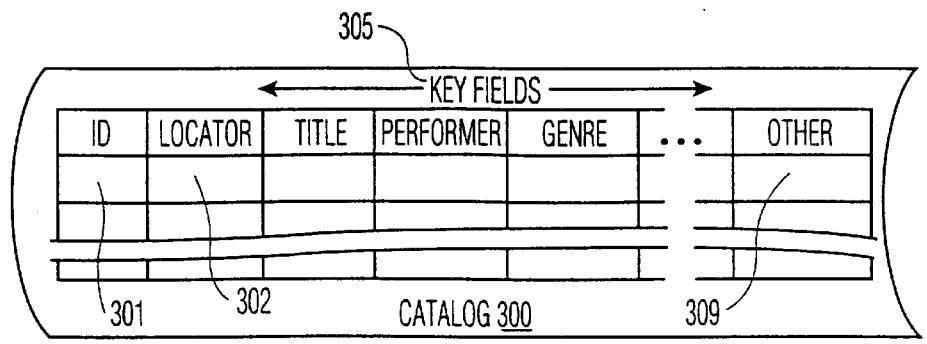
FIG. 3 illustrates an example embodiment of a catalog database for a collection management system in accordance with this invention.

Illustrated in FIG. 3 is an example catalog 300 that contains an identification 301 of each recording in the collection, and a locator 302 associated with each recording that identifies where the recording is located. In a preferred embodiment, the locator 302 is not limited to a single physical device, or a single set of storage devices 110, 120. The identification 301 may be, for example, the name of the recorded song, movie, show, etc., and the locator 302 may be an identification of the particular disk array 120, the disk number within that array 120, and the track within the disk identified by that disk number.

In a preferred embodiment, the catalog 300 also includes key fields 305 that may contain, for example, the title of the recording, the author, the performer, the genre, and so on, and the identification 301 is an index number, to which these key fields 305 can be referenced. That is, for example, using conventional data base search techniques, one could determine the identification number 301 of each of the recordings having a specified genre, and provide a list of the titles and performers associated with each determined identification number. In a preferred embodiment, the catalog 300 also includes an ancillary information 309 associated with each recording identifier 301. This ancillary information 309 includes, for example, a reference to other material, such as a news item related to the recording, a reference to another recording in another collection, a hyperlink address, a file containing the script or lyrics associated with the recording, and so on.

The ancillary information 309 need not be limited to information that is contained within the collection itself. For example, an indexed recording of an Elvis song may contain a hyperlink to another collection that contains a movie in which Elvis sang that song. Other information, such as recording time, media type, etc., may also be associated with each recording identifier 301.

Figure 4:
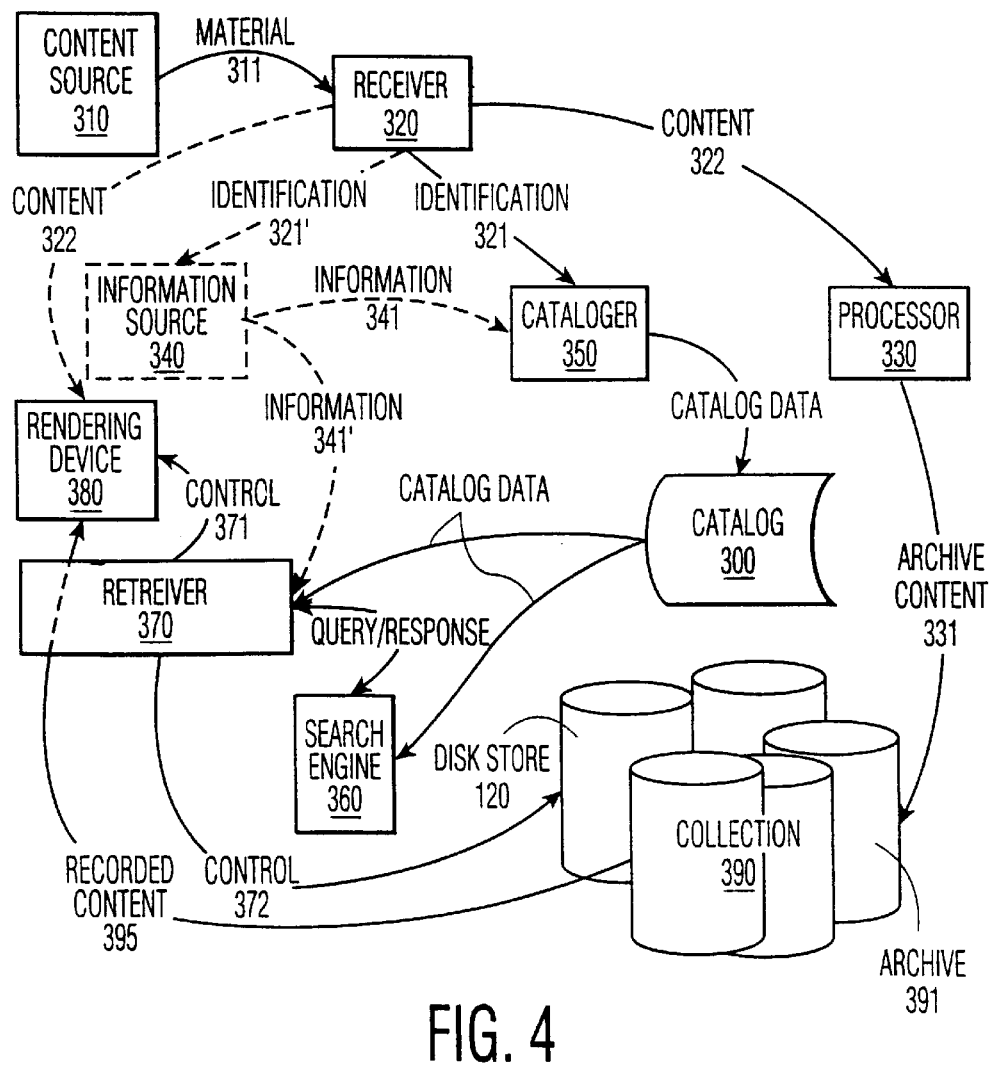
FIG. 4 illustrates an example block diagram of a collection management system in accordance with this invention.

As illustrated in FIG. 4, entries are made into the catalog 300 by a cataloger 350, and retrieval from the catalog 300 is effected by a search engine 360 and retriever 370. The cataloger 350 and retriever 370 form the basic collection manager 150 of FIG. 1. The cataloger 350 and retriever 370 are preferably embodied as a software program that is executable on a computing device (not shown). A user interface, discussed further herein, provides for user control of the cataloging and retrieval process. A preferred embodiment of this invention allows for the building of an archive of recordings from a content source 310. The archive in a preferred embodiment is an accumulation of copies of content material from one or more content sources 310 that allows for a playback of the content material from the archive storage device in lieu of the original content source 310. The content source may be, for example, a conventional playback device 130, such as a CD and DVD player, a cassette tape player, record player, VCR player, laser-disc player, and so on. In the integrated system 200 of FIG. 2, the content source is the integral CD/DVD device 130, or via an external connection 220. A receiver 320 receives material 311 from the content source 310, the content of the material being dependent upon the capabilities of the content source 310. If the content source, for example, is a legacy record player, the material 311 is limited to the recorded audio information. In this case, the receiver obtains an identification of the material 311 from an information source 340, such as an identification input from the user. This input may be a conventional text entry, or a spoken entry that is either converted to a text entry, or stored directly as a spoken identifier. If the content source is a CD or DVD, the material 311 includes the unique identifier that is associated with commercial CDs and DVDs. In this case, the receiver provides the identification to the information source 340 to facilitate the determination of other information 341 related to the material 311. For example, the identification can be used to access an Internet site to obtain detailed information regarding each commercial CD, such as the title, performer, etc. of each selection on the CD. Alternatively a user can enter such information, or provide direction to other sources of information regarding this material 311.

Figure 5:
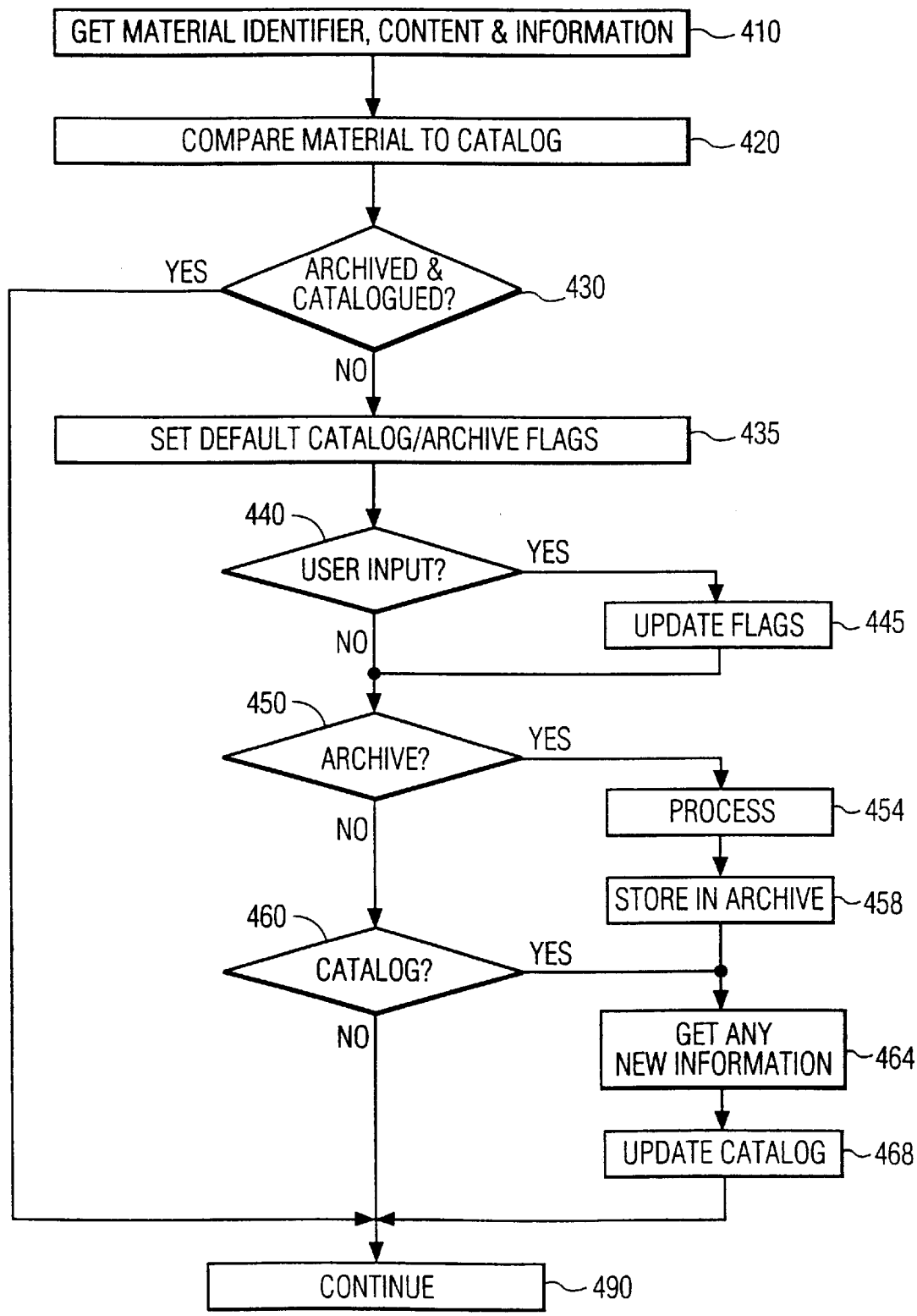
FIG. 5 illustrates an example flow diagram of a collection management process in accordance with this invention.

The processing of the material 311 and information 341 is best understood with reference to FIG. 5, which illustrates an example flow diagram of a cataloging and archiving process in accordance with this invention. Cataloging includes the storage of the identification 321 and information 341 regarding the content 322 of the recording, and archiving includes the storage of the content 322 itself At 410, the process discussed above is initiated to determine the identification 321 of the material 311 and related information 341. The identification 321 is compared with the information contained within the catalog 300, at 420. Other means of determining whether the playback information is already within the catalog would be evident to one of ordinary skill in the art. For example, a segment of the playback material can be compared to a corresponding segment in the catalogued material, using for example, a digital signature that is derived from each segment. Incorporated by reference herein is copending U.S. patent application "BIBLIOGRAPHIC MUSIC DATA BASE WITH NORMALIZED MUSICAL THEMES", U.S. Ser. No. 08/840,356, filed Apr. 4/28/97 for Mark Hoffberg, now allowed for issuance as a U.S. patent. This referenced application relates to an information processing system that has a music data base. The music.data base stores homophonic reference sequences of music notes. The reference sequences are normalized and stored to facilitate a search based on a string of input music notes. Other catalog search techniques will be evident to one of ordinary skill in the art in view of this disclosure. If the material has already been archived and cataloged, at 430, the process is bypassed, and the system continues uninterrupted, at 490.

At 435, default flags are used to identify whether cataloging or archiving should occur. In a preferred embodiment, a variety of options are available, and the system can be configured to select a predetermined set of options upon initialization. The predetermined options remain in effect unless overridden by a user input, at 440 and 445. In accordance with one aspect of this invention, the archive options include:

Archive while playing back (auto-archive);

Archive without playing back (fast-archive); and,

Store for subsequent archive processing (background-archive).

If any of the archive options are set, at 450, the content 322 of the recorded material 311 is processed for storage by the processor 330 of FIG. 3, at 454. In a preferred embodiment, the processing includes an encoding of the information in a compacted, or compressed, form, such as an encoding into MPEG or DCC.

In the auto-archive mode, the processing occurs while the material is being received. This option, however, requires that the processing be accomplished at least as quickly as the material arrives for rendering. That is, for example, if the material is a video stream having a 30 frame per second arrival rate, the collection building system must be able to process the received information at an aggregate rate of 30 frames per second, and must contain sufficient buffering to cope with potential bursts of data as the information content of frames vary. In the strict auto-archive mode, the processing of the material is bound by the presentation speed; that is, in the above example, the processing of the material can not exceed an aggregate rate of 30 frames per second, because 30 frames per second is the speed at which the information is arriving.

The fast-archive mode is used whenever the material need not be presented to the user while it is being processed. In this mode, the speed of processing is limited only by the time required to effect the processing. The speed of processing may be less than or greater than the nominal presentation speed. Using the above example, if the processing is performed efficiently by a high speed processor, and if the playback device provides the material as quickly as the processing can be effected, the archive rate may be substantially greater than 30 frames per second. Conversely, if the processing is slow, the archive rate may be substantially less than 30 frames per second.

The background-archive mode is used to rapidly store the material being received, while deferring the processing until a later time, when the system is less busy. This mode can be used to rapidly load the material into the system, a process that typically requires human interaction, and then leave the system unattended. This mode can also be used to rapidly load the material into the system and then replay it at presentation speed, while the processing occurs at its own pace.

A mix of these archive modes is also supported. For example, the material can be continually buffered into storage, and then presented from storage and processed from storage simultaneously. Assuming that the average processing rate is at least as fast as the presentation rate, the processing for archiving can occur at its own pace, either faster or slower than the presentation rate, until the difference in rate causes the buffer to approach its limit of capacity, at which time the processing is slowed down.

The processing for archiving, at 454, in a preferred embodiment includes a compression of the material, using for example, an MPEG encoding, a DCC encoding, and the like. As would be evident to one of ordinary skill in the art, if the content 322 is in the appropriate form, no further processing is required, and for example, a direct disk-to-disk transfer can be effected. U.S. patent Application "SELECTIVE BY-PASS OF ANALOG MODE IN COMMNICATION BETWEEN DIGITAL DEVICES", U.S. Ser. No. 08/994,887, filed Dec. 12/19/92 for Paul Chambers, presents a method for fast data transfer by avoiding the decoding and subsequent encoding associated with the transfer of content material via analog communication paths, and is incorporated by reference herein.

At 458, the processed material is stored to an archive device 110, typically a hard drive. Note that by archiving a recording, the archive copy also provides a safeguard in the event of a loss of the original medium providing the content 322. If a recording is archived, it is automatically catalogued by the cataloger 350, at 464–468. If a recording is not archived, at 450, it may or may not, at 460, be catalogued. This option is provided for a recording that is intended to remain at its current location at the content source 310, yet managed by the collection management system in accordance with this system. This option includes the cataloging, for example, of a CD recording in a multiple CD storage/playback device 120, the cataloging of a recording that is located at an Internet site, and so on.

If the material 311 is to be catalogued, via 458 or 460, any additional information 341 that is to be associated with the recorded material is determined, at 464. As noted above, this material could be provided via input from the user, via input from an associated database, via input from an Internet site, and so on. The identifier 301 of each selection, its locator 302, and any ancillary material 305, 309 is stored in the archive catalog 300, at 468. The identifier 301 is derived from the identification information 321, and may be a copy of the information 321 or a translation of the information 321 into a form that is specific to the catalog 300. The locator 302 is an identifier to a location within the collection 390 where the content 322 of the material 310 can be found. If, for example, the content 322 has been archived to a file on the archive device 391, its locator 302 is the name of the archive storage device 391 followed by the name of the file. If the content source 310 forms a part of the collection 390, for example a multi-disk CD storage and player device 120, the locator 302 is the name of the player 120 followed by a disk number and track number or selection number. As noted above, the physical size of each storage device 110, 120 does not, per se, limit the size of a collection 390. If additional storage is required, another storage device 110, 120 need only be added to the collection 390. Because the catalog 300 contains a locator 302 that provides an identifier of where the recording is located, the actual location of the recording, and therefore the size of the collection 390, is only limited by the constraints and capabilities of the catalog 300, and not the physical bounds among storage devices 110, 120.

The retriever 370 uses the catalog 300 to retrieve recordings from the collection 390. In a straightforward embodiment, the retriever 370 presents a list of the key fields 305 of the catalog data to a user. The user selects an entry from the list, and the retriever determines the locator 302 that is associated with that selected entry. Illustrated in FIG. 4 is a rendering device 380. The rendering device 380 is the device with which the recording is presented to the user. This rendering device 380 may be an independent component, or integrated within a content source 310, a receiver 320, or other component within the system. For example, if the recording is an audio recording, the rendering device 380 may be an amplifier and speaker system; if the recording is a video recording, the rendering device 380 may be a television, a computer display, and so on. The rendering device 380 is used to render the original content 322 during the "archive while playing back" option discussed above, to render retrieved recorded content 395 from the collection 390, and so on. In most applications, the collection 390 has one associated default rendering device 380, such as the A/V system 180 of FIG. 1. If multiple rendering devices 380 are supported, the catalog 300 will contain an identification of the class or classes of rendering device 380 suitable for each recording in the catalog. Based on the locator 302 associated with the selected recording, the retriever 370 provides the appropriate control information 371 to the rendering device 380 to effect the rendering of the selected recording in the collection 390. If, for example, the locator 302 indicates that the selected recording is located on a disk store/playback device 120 at a particular disk and track location, the retriever 370 instructs, via control 371, the rendering device 380 to take its input from the disk store/playback device 120, and instructs, via control 372, the disk store/playback device 120 to play the identified disk, starting at the specified location. If, in another example, the locator 302 indicates that the selected recording is stored in the archive 391, the retriever 370 receives the archive content 331 from the archive 391 and provides it to the rendering device 380 in a suitable form. If, for example, the archive content 331 is in an MPEG format, and the rendering device 380 is MPEG-compatible, the retriever 370 provides the content 331 directly to the rendering device 380 as the recorded content 395. If, on the other hand, the rendering device 380 is not MPEG-compatible, and only accepts NTSC format signals, the retriever 370 performs the appropriate translation, or accesses another processor (not shown) to effect this translation, to provide the required NTSC format signals as input to the rendering device 380, as indicated by the dashed lines within the path of the recorded content 395.

The retriever 370 in a preferred embodiment also allows for access to the catalog 300 via a search engine 360. The search engine 360 includes capabilities for searching the catalog 300 based on the aforementioned key fields, and includes context-sensitive search techniques, searches based on user preferences and prior user behavior, and so on. The retriever 370 provides a query or sequence of queries to the search engine 360, and the search engine 360 provides catalog data in response to each query. The retriever 370 formulates the query based on a user input, which can be in a variety of forms, including a keyboard entry, a touchscreen entry, a spoken entry, and so on. For example, the integrated system 200 of FIG. 2 may be located in an automobile, and a vocal entry of "Play classics" effects the selection of all the recordings on the hard drive 110 having a genre of "classic". Depending upon the user's preference, the recordings will be played in sequential or random order, starting from the last classic recording that was rendered for this user. These and other techniques for providing selections based on a user's expressed or implied preferences will be evident to one of ordinary skill in the art in view of this invention.

Figure 6A:
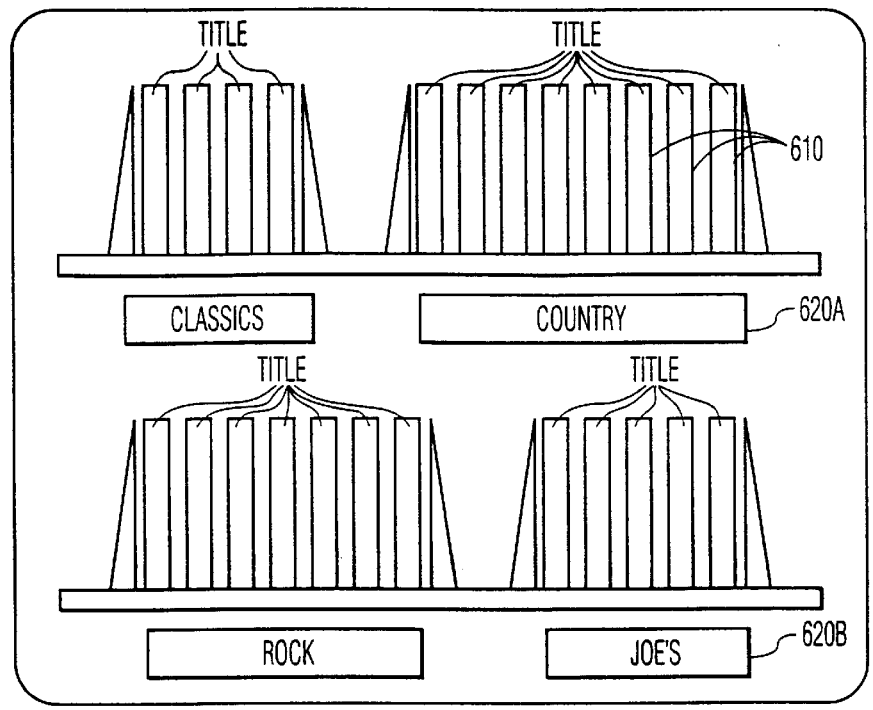
FIGS. 6A–6B illustrate example user interfaces in accordance with this invention.
Figure 6B:
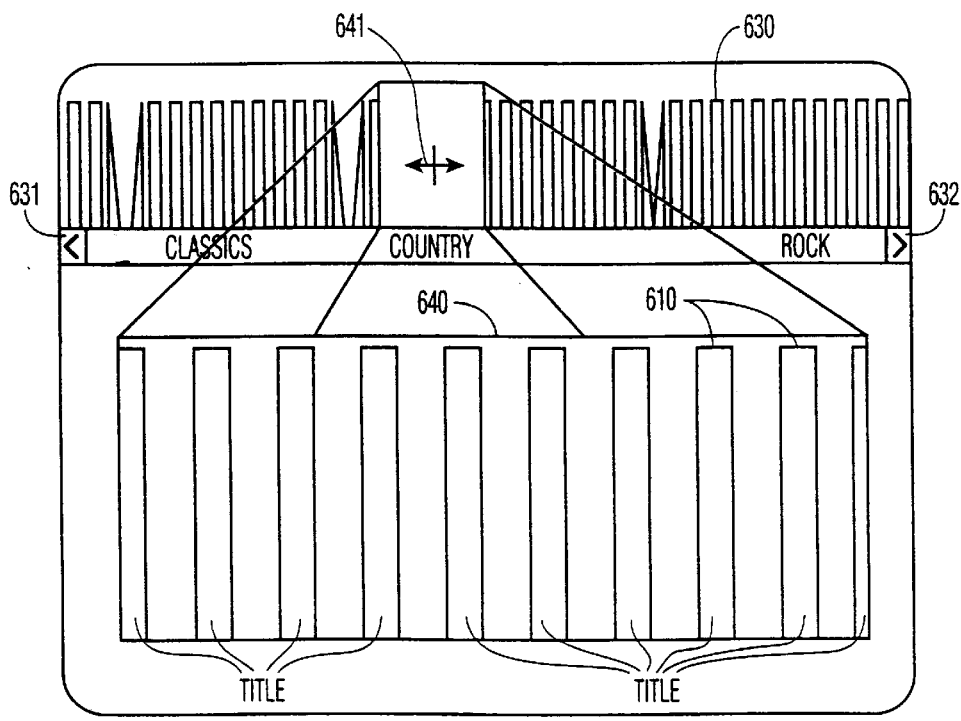

The presentation of the information of the catalog 300 in a preferred embodiment of this invention is not limited to a text display. FIG. 6A illustrates a presentation of the catalog 300 in a graphic form that is representative of the conventional storage of disks on a rack, as might be presented by the retriever 370. The individual sets of recordings 610 are illustrated as disk cases, organized by genre 620A, ownership 620B, or any other user definable groupings. Because this display is a virtual representation of a collection, the same disk case may be illustrated in multiple groupings. For example, the category "Joe's" 620B may be a user defined category for Joe's favorite recordings, some of which may be country-music recordings. These favorite country-music recordings will be represented by a disk case on each illustrated shelf, in the "country" category 620A, and in the "Joe's" category 620B. In accordance with this invention, the virtual representation also allows for alternative arrangements of selections, without requiring a physical rearrangement of media devices. For example, a user may prefer to reorganize the collection by performer, rather than by genre, or in addition to genre. Techniques for sorting and organizing information from the catalog 300 are common in the art. The results of such sorting and organizing, in accordance with this aspect of the invention, is a visual form that is familiar to a user, thereby providing the user with a degree of comfort and familiarity that increases the perceived worth of the collection management system. An alternative presentation of the catalog 300 information that is particularly well suited for a large collection is illustrated in FIG. 6B. In this hierarchical presentation, the user is provided a scrollable (left 631, right 632) high-level view 630 of a portion of the catalog 300 information, and a scrollable (left-right 641) "zoom" view 640 of individual selections 610. In a preferred embodiment the user may modify the views 630, 640 to display more or less of the collection, with less and more detail, respectively.

Figure 7A:
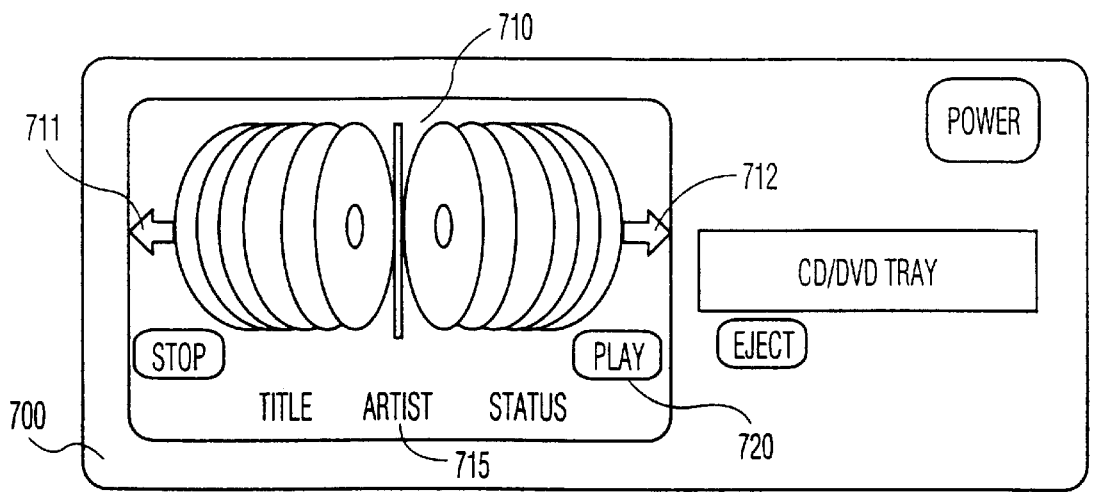
FIGS. 7A–7B illustrate alternative example user interfaces in accordance with this invention.
Figure 7B:
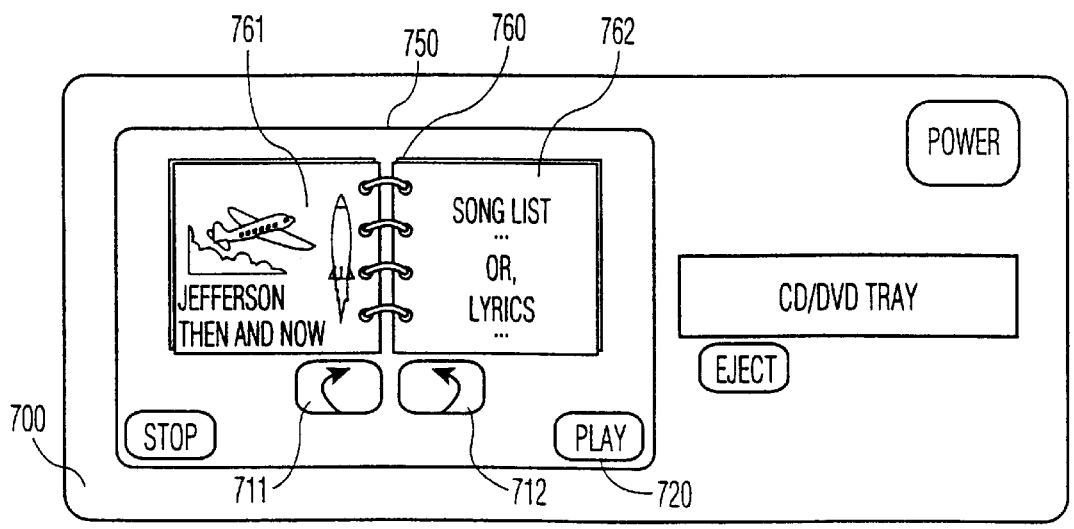

FIGS. 7A and 7B illustrate other example selection presentation devices 700 for the presentation of the catalog 300 information. In FIG. 7A, the catalog 300 is illustrated as a carousel of disks 710, similar to the carousels of legacy jukebox devices. The carousel 710 is rotated by the control arrows 711, 712, as may be implemented on the example touch screen 250 of FIG. 2. As the carousel 710 is rotated, the title of the selection, the name of the performing artist, and other information 715 is displayed, corresponding to each disc on the carousel. As in the example illustrations of FIGS. 6A and 6B, the ordering of selections on the virtual carousel 710 can be in any order that is convenient to the user for effecting a selection. When the carousel 710 is positioned at a desired recording 715, the user touches the play 720 button to effect the retrieval and rendering of the desired recording. Note that the actual location of the recording is of no relevance to this selection process. That is, whether the selection is at one of a half dozen 100-disk CD players in the user's home, or in a hard drive that is integral to the selection display device 700 is irrelevant, provided that the selection device 700 has access to the selected device. In a preferred embodiment, the selections presented on the carousel 710 are limited to those to which the selection device 700 has access.

FIG. 7B illustrates another example graphic user interface (GUI) 750 for a presentation device 700. In this user interface, the catalog information is presented using a representation of a book 760, or folder, within which the recordings are illustrated graphically 761 and textually 762. The user controls 711, 712, and 720 operate as in FIG. 7A. The controls 711, 712, and 720 may also be effected by vocal commands "back", "next", and "play", respectively. In a preferred embodiment of this invention, the presentation device 700 is configurable to support a choice of languages for the text items of the display, and for the vocal command processing. To enhance the ease of recognition and selection, the graphic representation 761 is preferably a recognizable image, such as the "jacket cover" that is associated with individual CDs or DVDs. The jacket cover may be obtained, for example, from an Internet set, based on the unique CD identifier, or it may be input by scanning an image from the original CD or DVD jacket. The text representation may be a listing of song titles, which automatically changes to a listing of the lyrics associated with the song that is currently selected within that song title list. In accordance with this invention, the displayed information may be obtained from an information source when the material is catalogued, or from an information source at the time the material is being considered for selection. The "displayed" information could also include renderings of samples from the recorded material. These and other display techniques will be evident to one of ordinary skill in the art in light of this invention.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the user interface device 700 may have a programmable user interface. Copending U.S. Patent Application "INTERNET-BASED SERVICE FOR UPDATING A PROGRAMMABLE CONTROL DEVICE", U.S. Ser. No. 09/311,128, filed May 13,1999 for Joost Kemink, incorporated by reference herein, discloses the downloading of information to modify the user interface, based for example on an interface schema that is developed by a third party to enhance the usability of the controlled device. With such an embodiment, each of the alternative example interfaces of FIGS. 6A, 6B, 7A, and 7B could be downloaded from the Internet, replacing whatever interface had been provided initially with the product.

In another example embodiment, the user interface to the retriever 370 may be via a remote control device that accesses the retriever 370 either directly via, for example, an infra-red link, or indirectly via the network 100. Copending U.S. patent application "REMOTE CONTROL DEVICE WITH LOCATION DEPENDENT INTERFACE", U.S. Ser. No. 09/210,416, filed Dec. 11,1998 for Joost Kemink, discloses the use of a location determination device to select or modify the user interface in dependence upon the location of a remote control device, and is incorporated by reference herein. In like manner, the controls included in the GUI may differ depending upon the geographic location of the user, using, for example, different language text in different countries: The controls and selection criteria may also be dependent upon a time parameter, such as the time of day, season-of the year, and so on.

The particular configurations in the accompanying figures are provided for illustration purposes. Alternative arrangements can be defined. For example, the integrated system 200 of FIG. 2 includes an integral media player 130; a lower cost embodiment, such as one for portable use, could include a simplified retriever 370, catalog 300, archive 391, and rendering device 380. In such an embodiment, the portable device could be "docked" to a full cataloging system that includes playback and storage devices 110, 120, 130, a cataloger 350, and a processor 330 for creating the archive content 331 that can be directly transferred to the archive 391 in the portable device. These and other system configuration and optimization features will be evident to one of ordinary skill in the art in view of this disclosure, and are included within the scope of the following claims.

I claim:

1. A content processing device comprising:
   a receiver that receives content data from a content source, wherein the content data comprises audio information,
   a processor, operably coupled to the receiver, that processes the content data and produces therefrom archive content,
   a storage device, operably coupled to the processor, that accumulates the respective archive content at a respective location, a cataloger, operably coupled to the receiver and the storage device, that associates the location corresponding to the archive content to an identifier of the content data, and a retriever, operably coupled to the storage device, that facilitates a selection of at least one of the archive content and the content data, based on information associated with the identifier of the content data; the content processing device-comprises a Consumer Electronics (CE) device.

2. The content processing device of claim 1, wherein the cataloger is enabled to associate ancillary information to the identifier of the content data.

3. The content processing device of claim 1, wherein the retriever includes means for transforming the archive content into a form suitable for rendering by a rendering device.

4. The content processing device of claim 1, wherein the content source is a recording medium, and the receiver includes a playback device that receives the content data by accessing information that is stored on the recording medium.

5. The content processing device of claim 4, wherein the playback device also renders the content data in an audible form while the processor is processing the content data to form the archive content.

6. The content processing device of claim 1, wherein the content source is at least one of: a playback device, a storage device, and an Internet site.

7. The content processing device of claim 1, wherein the archive content comprises at least one of a Philips DCC compression and an MPEG compression.

8. The content processing device of claim 1, wherein
the storage device is also configured to store the content data, for subsequent processing by the processor to produce the archive content.

9. The content processing device of claim 1, wherein
the cataloger associates one or more information items to the identifier, and
the retriever facilitates the selection based also on the one or more information items.

10. The content processing device of claim 1, wherein the retriever includes
a graphic user interface that facilitates the selection.

11. The content processing device of claim 1, wherein the device comprises a portable device.

* * * * *